(12) United States Patent
Sambhar

(10) Patent No.: US 11,411,947 B2
(45) Date of Patent: Aug. 9, 2022

(54) SYSTEMS AND METHODS FOR SMART CONTRACT-BASED DETECTION OF AUTHENTICATION ATTACKS

(71) Applicant: JPMorgan Chase Bank, N.A., New York, NY (US)

(72) Inventor: Ankur Sambhar, Thane West (IN)

(73) Assignee: JPMORGAN CHASE BANK, N.A., New York, NY (US)

( * ) Notice: Subject to any disclaimer, the term of this patent is extended or adjusted under 35 U.S.C. 154(b) by 571 days.

(21) Appl. No.: 16/280,126

(22) Filed: Feb. 20, 2019

(65) Prior Publication Data

US 2020/0267137 A1 Aug. 20, 2020

(51) Int. Cl.
*H04L 9/40* (2022.01)
(52) U.S. Cl.
CPC ........ *H04L 63/083* (2013.01); *H04L 63/1416* (2013.01); *H04L 63/20* (2013.01)
(58) Field of Classification Search
CPC ............ H04L 63/1433; H04L 63/1441; G05B 19/4185; G05B 19/4188
See application file for complete search history.

(56) References Cited

U.S. PATENT DOCUMENTS

| | | | |
|---|---|---|---|
| 2018/0054432 A1* | 2/2018 | Bailey | H04W 12/068 |
| 2019/0213312 A1* | 7/2019 | Tussy | H04W 12/06 |
| 2020/0014528 A1* | 1/2020 | Nandakumar | H04L 9/3228 |
| 2020/0042685 A1* | 2/2020 | Tussy | G06K 9/00892 |
| 2020/0220886 A1* | 7/2020 | George | H04L 63/12 |

* cited by examiner

*Primary Examiner* — Matthew Smithers
*Assistant Examiner* — Shu Chun Gao
(74) *Attorney, Agent, or Firm* — Greenberg Traurig LLP

(57) ABSTRACT

Systems and methods for smart contract-based detection of authentication attacks are disclosed. According to one embodiment, a method may include: (1) receiving an identification of a plurality of password-protected resources from an account holder; (2) receiving a rule identifying an automated protective action to be taken in response to a failed login attempt with one of password-protected resources; (3) receiving, at a distributed ledger, a notification of a login attempt with one of the plurality of password-protected resources; (4) a smart contract or self-executing code executed by the information processing apparatus determining that the login attempt meets the rule; (5) the smart contract or self-executing code taking the automated protective action with the one of the plurality of password-protected resources and another of the plurality of password-protected resources; and (6) the smart contract or self-executing code committing the automated protective action to the distributed ledger.

20 Claims, 2 Drawing Sheets

SYSTEMS AND METHODS FOR SMART CONTRACT-BASED DETECTION OF AUTHENTICATION ATTACKS

BACKGROUND OF THE INVENTION

1. Field of the Invention

The present disclosure generally relates to systems and methods for smart contract-based detection of authentication attacks.

2. Description of the Related Art

Banks and other financial institutions try to protect their customers from fraudulent activity monitoring customers' accounts. Unfortunately, if any of a customer's access is compromised or is under attack, the customer's other bank accounts may not be aware, which may lead to a security risk.

SUMMARY OF THE INVENTION

Systems and methods for smart contract-based detection of authentication attacks are disclosed. According to one embodiment, in an information processing apparatus comprising at least one computer processor, a method for smart contract-based detection of authentication attacks may include: (1) receiving an identification of a plurality of password-protected resources from an account holder; (2) receiving a rule identifying an automated protective action to be taken in response to a failed login attempt with one of password-protected resources; (3) receiving, at a distributed ledger, a notification of a login attempt with one of the plurality of password-protected resources; (4) a smart contract or self-executing code executed by the information processing apparatus determining that the login attempt meets the rule; (5) the smart contract or self-executing code taking the automated protective action with the one of the plurality of password-protected resources and another of the plurality of password-protected resources; and (6) the smart contract or self-executing code committing the automated protective action to the distributed ledger.

In one embodiment, the password-protected resources may include at least two of a financial account, a social media account, an email account, and a merchant account.

In one embodiment, the password-protected resources may include financial accounts from a plurality of financial institutions.

In one embodiment, the rule may identify a number of failed login attempts before the automated protective action is taken.

In one embodiment, the automated protective action may include locking the plurality of password-protected resources, requiring elevated authentication to login to any of the plurality of password-protected resources, notifying the account holder, etc.

In one embodiment, the automated protective action may be based on a prior automated protective action taken with one of the plurality of password-protected resources.

In one embodiment, the notification of the login attempt may include a number of login attempts, success or failure of the login attempt, a location of the login attempt, an IP address of the login attempt, a date and time of the login attempt, transaction particulars associated with the login attempt, and a type of login attempt. The transaction particulars may include at least one of a merchant identifier, a transaction amount, and a type of good/service. The type of login attempt may include a username/password login attempt, a biometric login attempt, etc.

In one embodiment, the password-protected resources with which the automated protective action is taken may be based on the type of password-protected resources for which the notification was received.

According to another embodiment, a system for smart contract-based detection of authentication attacks may include an interface for an account holder; a plurality of hosts, each host hosting a password-protected resource; a distributed ledger; and an information processing apparatus comprising at least one computer processor and executing a smart contract or self-executing code. The information processing apparatus may receive an identification of the password-protected resources from the interface for the account holder, and may receive a rule identifying an automated protective action to be taken in response to a failed login attempt with one of the password-protected resources from the interface for the account holder. The distributed ledger may receive, from one of the hosts, a notification of a login attempt with one of the plurality of password-protected resources. The smart contract or self-executing code may determine that the login attempt meets the rule, may take the automated protective action with the one of the plurality of password-protected resources and another of the plurality of password-protected resources, and may commit the automated protective action to the distributed ledger.

In one embodiment, the password-protected resources may include at least two of a financial account, a social media account, an email account, and a merchant account.

In one embodiment, the password-protected resources may include financial accounts from a plurality of financial institutions.

In one embodiment, the rule may identify a number of failed login attempts before the automated protective action is taken.

In one embodiment, the automated protective action may include locking the plurality of password-protected resources, requiring elevated authentication to login to any of the plurality of password-protected resources, notifying the account holder, etc.

In one embodiment, the notification of the login attempt may include a number of login attempts, success or failure of the login attempt, a location of the login attempt, an IP address of the login attempt, a date and time of the login attempt, transaction particulars associated with the login attempt, and a type of login attempt.

In one embodiment, the type of login attempt may include a username/password login attempt, a biometric login attempt, etc.

In one embodiment, the password-protected resources with which the automated protective action is taken may be based on the type of password-protected resources for which the notification was received.

BRIEF DESCRIPTION OF THE DRAWINGS

For a more complete understanding of the present invention, the objects and advantages thereof, reference is now made to the following descriptions taken in connection with the accompanying drawings in which.

DETAILED DESCRIPTION OF PREFERRED EMBODIMENTS

Figure 1:
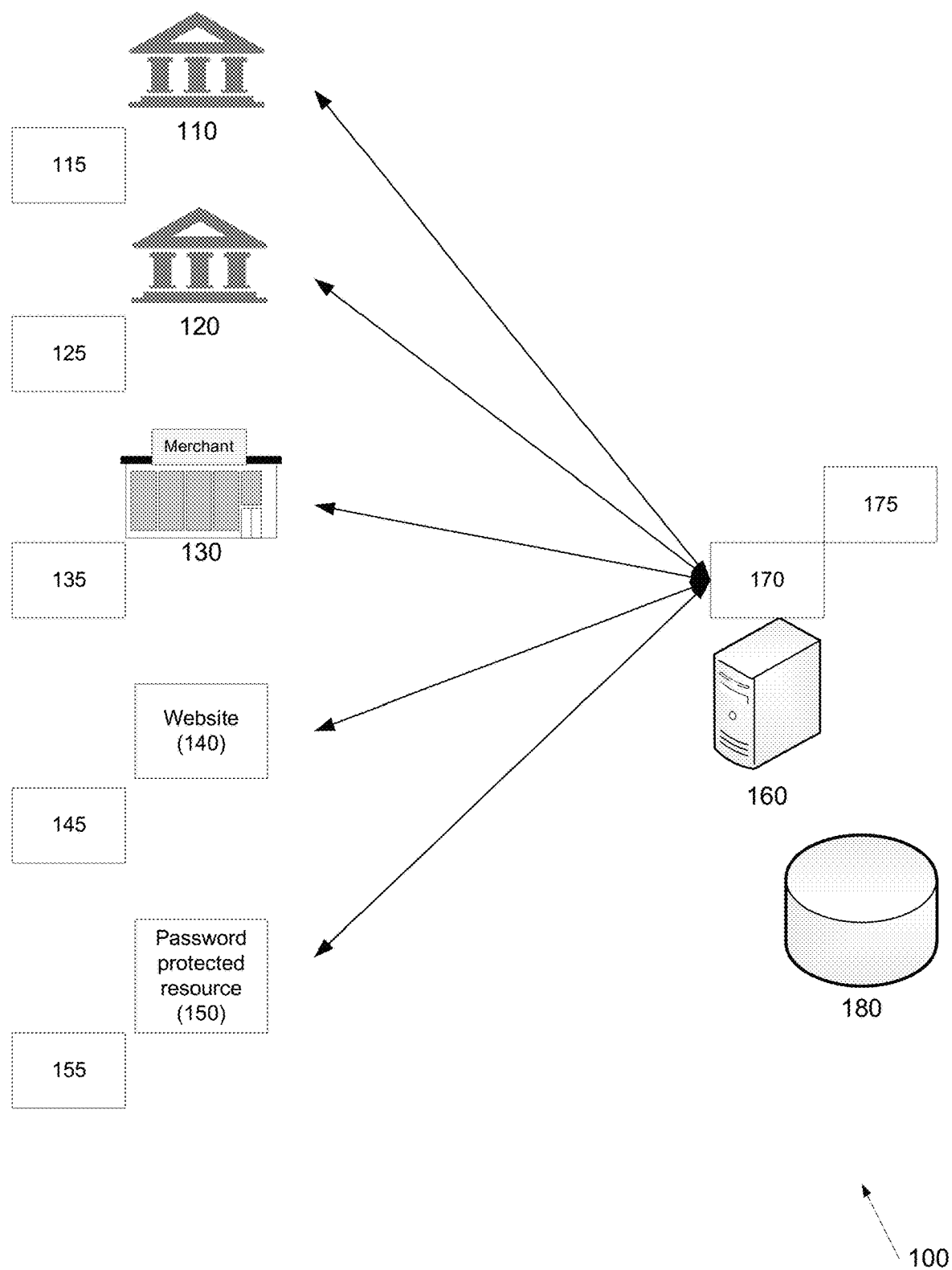
FIG. 1 depicts a system for smart contract-based detection of authentication attacks according to one embodiment.

Embodiments disclosed herein relate to systems and methods for smart contract-based detection of authentication attacks.

In embodiments, when authenticating user, a system may check to see if any of user's other registered accounts have been recently attacked and/or if there are any other security risk alerts for any of the user's accounts. If there has been a recent attack, an elevated authentication mode may be enabled. In this elevated mode, additional validations may be required, the account may be temporarily locked, the user may be required to change the user's password, etc.

In embodiments, when opening an account, a user may be associated with a smart contract (e.g., self-executing computer code) with which the user may register the new account and any other user accounts. The smart contract may record and track the user's logins and transactions across multiple user accounts.

In one embodiment, the registered accounts and account activity may be committed to a distributed ledger, such as a Blockchain-based ledger.

When the user logs in to one of the registered accounts, or conducts a transaction involving any of the registered accounts, the login details may be provided to the smart contract. The smart contract may execute an algorithm to analyze the login attempt the transaction. If there are multiple failed login attempts, the smart contract may identify a potential attack on the account and may cause any authentications involving any of the user's accounts to be performed in the elevated authentication mode.

For example, if Alice has a saving account with Bank A, a direct deposit account with Bank B, and a checking account with Bank C, Alice may register each of the accounts with a smart contract. When one of Alice's accounts is accessed, the smart contract will be notified of the activity. For example, the host of the account (e.g., the financial institution, the merchant, the email provider, etc.) may inform the smart contract of the activity. The smart contract may be provided with the number of login attempts, the date, time and location of login request, the type of transaction carried out, the amount of transaction, etc.

In one embodiment, the data may be written to a distributed ledger (e.g., a Blockchain-based ledger) and may be encrypted.

In one embodiment, the user may establish various rules for the smart contract that may allow the user to define, for example, a threshold for generating a risk alert or for taking an automated protective action (e.g., requiring elevated authentication, temporarily locking the user's account(s), etc.). For example, the user may specify the number of failed login attempts before the smart contract takes the automated protective action. Similarly, the user may define rules based on various attributes of the login attempt, such as the location of the login attempt, the amount of the potential transaction associated with the login attempt, the type of potential transaction associated with the login attempt, etc. The user may specify the thresholds based on, for example, the user's risk appetite, the sensitivity of the user's accounts, etc.

In addition to financial accounts, the user may register any suitable type of account, such as social network accounts, email accounts, website accounts, merchant accounts, etc. If any threats or attempts to breach any of the accounts are detected, the system may take an automated protective action.

In one embodiment, the user's digital footprint may be used to detect fraud, resolve fraud, etc. For example, a login that is from a registered device that requires biometric authentication is less likely to be fraudulent than a login from an unregistered device.

In one embodiment, out-of-band notifications may be provided to the user using, for example, the user's smart phones, watches, Internet of Things ("IoT") devices, etc., or by any other suitable communication channel, mechanism, or device.

As discussed above, a distributed ledger, such as a Blockchain-based distributed ledger, may provide interoperability across multiple devices and/or platforms, and may enable a variety of account types to be associated. Thus, with the example above, the different banks do not need to trust each other in order to share their user specific account access data, nor do they need to trust a central authority to do the same. Instead, a public or private distributed ledger may provide this functionality and trust.

In embodiments, the disclosed fraud detection may be provided by a third party as a service, or it may be defined by the user.

Referring to FIG. 1, a system for smart contract-based detection of authentication attacks is disclosed according to one embodiment. System 100 may include hosts or resources with which a user may have an password-protected account, such as financial institutions 110 and 120, merchant 130, social media websites 140, and other password-protected resources 150 (e.g., email systems, merchant accounts, smartphones, digital wallets, etc.). In one embodiment, each resource 110, 120, 130, 140 may maintain a copy of a distributed ledger 115, 125, 135, 145, 155.

In one embodiment, resources 110, 120, 130, 140, 150 may participate as a node in the distributed ledger. In one embodiment, each resource 110, 120, 130, 140, 150 may participate directly (e.g., may write to its copy of the distributed ledger directly) or indirectly (e.g., may write to a copy of the distributed ledger via an API or other suitable interface, etc.).

Resources 110, 120, 130, 140, 150 may interface with server or other electronic device 160 that may execute fraud detection program 170. In one embodiment, resources 110, 120, 130, 140, 150 may communicate using any suitable communication channel, including the Internet, WiFi, cellular, satellite, a combination of communication channels, etc.

In one embodiment, each of resources 110, 120, 130, 140, 150 may include an interface (e.g., an API, code, etc.) that may communicate with server 160 and/or fraud detection program 170 to provide data regarding logins, attempted logins, and other user account activity.

In one embodiment, server 160 and/or fraud detection program 170 may be provided by, or hosted by, one or more of resources 110, 120, 130, 140, 150. In another embodiment, server 160 and/or fraud detection program 170 may be provided by, or hosted by, a third party.

In one embodiment, ledgers 115, 125, 135, 145, 155 may communicate with each other, as well as with copy of distributed ledger 175 that may be maintained by fraud detection program 170.

In one embodiment, one or more of the ledgers 115, 125, 135, 145, 155, 175 may execute a smart contract, or self-executing code, that may respond to actions what is committed to the distributed ledger and/or rules stored in database 180. In one embodiment, the smart contract may take an automated action in response to activity written to the distributed ledger, such as requiring enhanced authentication, temporarily lock the account(s), etc.

In one embodiment, database 180 may store rules, thresholds, parameters, etc. that specify how the smart contract responds to a committed action. The rules, thresholds, parameters, etc. may be defined by the user, by any of resources 110, 120, 130, 140, 150, based on machine learning, etc.

Figure 2:
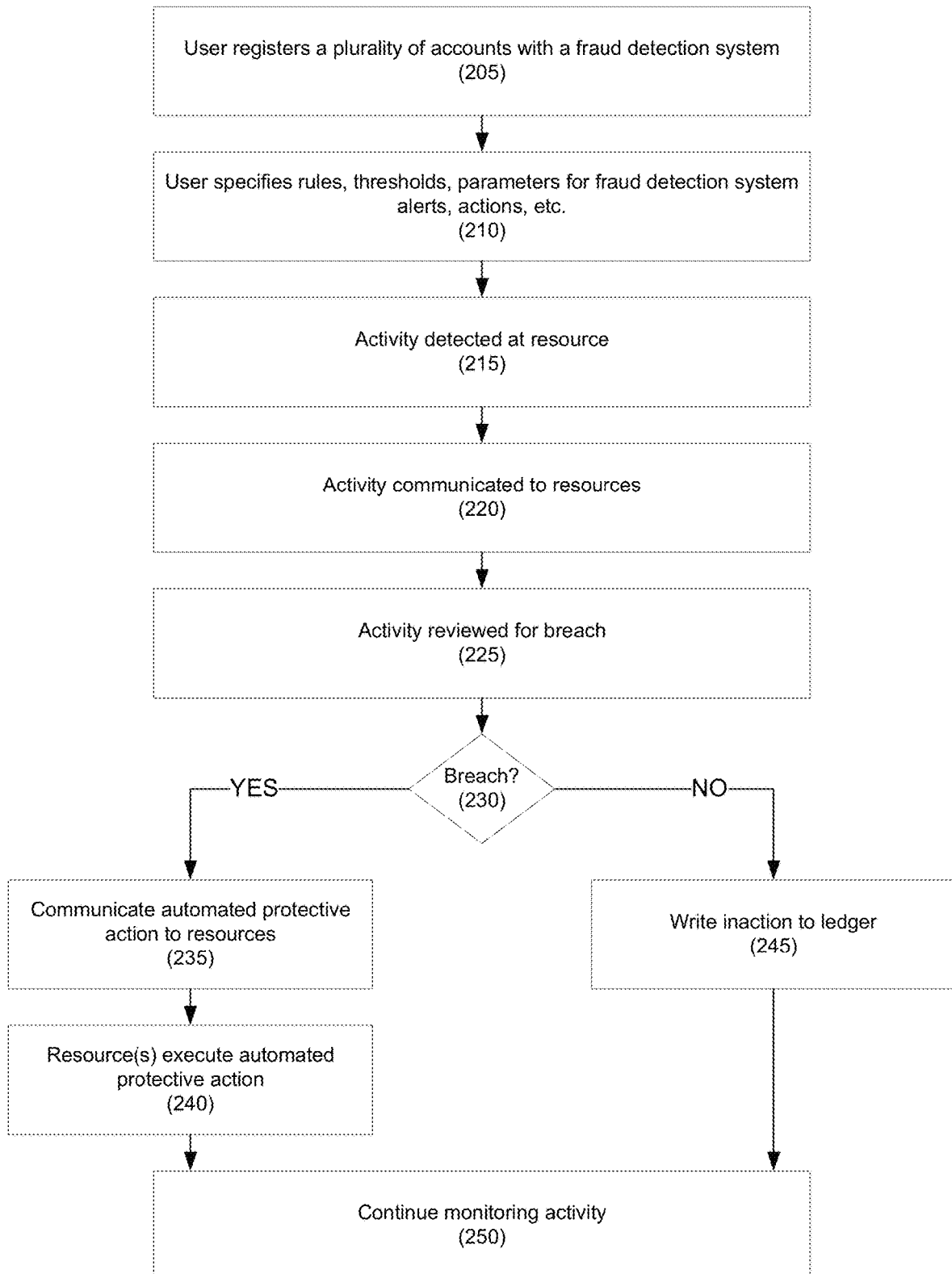
FIG. 2 depicts method for smart contract-based detection of authentication attacks according to one embodiment.

Referring to FIG. 2, a method for smart contract-based detection of authentication attacks is disclosed according to one embodiment.

In step 205, a user may register a plurality of accounts that the user may have with a password-protected resource with a fraud detection system. In one embodiment, the user may register during account creation by creating a fraud detection profile; in another embodiment, the user may add an account to an existing fraud detection profile.

In one embodiment, the user may register any suitable type of account, including, for example, financial accounts, social network accounts, email accounts, website accounts, merchant accounts, etc.

In step 210, the user may specify one or more rules, thresholds, parameters, etc. to be applied by the fraud detection system. For example, the rules, thresholds, parameters, etc. may specify one or more action to take in response to account activity received from one or more resource hosts. For example, the user may specify a number of failed login attempts before the fraud detection system takes an automated protective action. Similarly, the user may define rules based on various attributes of the login attempt, such as the location of the login attempt, the amount of the potential transaction associated with the login attempt, the type of potential transaction associated with the login attempt, etc. The user may specify the thresholds based on, for example, the user's risk appetite, the sensitivity of the user's accounts, etc.

The user may also specify the automated protective action that the user wants the fraud detection system to take, such as requiring elevated authentication (e.g., biometric authentication, multi-factor authentication, out-of-band authentication, etc.), temporarily locking the user's account(s), requiring a password change, etc.

In one embodiment, the user may also set default rules, may request that the rules be based on machine-learning based on activity with the user's accounts, with other user's accounts, etc.

In step 215, a resource with which the user has a registered account may detect activity, such as a login attempt.

In step 220, the resource may communicate the login attempt to the fraud detection system. In one embodiment, the resource may communicate parameter(s) associated with the login attempt, such as number of login attempts, success or failure, location of login attempt, IP address of login attempt, date and time of login attempt, transaction particulars associated with the login attempt (e.g., merchant identifier, amount, type of good/service, etc.), type of login attempt (e.g., username/password, biometrics, etc.).

In one embodiment, the resource may write the login attempt and login attempt parameters to a distributed ledger.

In step 225, a smart contract or self-executing code may review the login attempt and login attempt parameters. In one embodiment, the smart contract or self-executing code may receive the rules, thresholds, parameters, etc. and the automated protective actions to take in response to one of the rules, thresholds, parameters, etc. being breached.

If, in step 230, the smart contract or self-executing code determines that the one of the rules, thresholds, parameters, etc. was breached, in step 235, the smart contract or self-executing code may identify and communicate the specified automated protective action for the resources to take. For example, the automated protective action may include notifying the user, requiring elevated authentication, temporarily locking the user's account, requiring the user to change the passwords for one or more of the accounts, etc.

In one embodiment, the smart contract or self-executing code may write the automated protective action to the distributed ledger. In another embodiment, the smart contract or self-executing code may communicate the automated protective action to one or more of the resource(s).

In step 240, the resources may take the automated protective action. In one embodiment, not all resources may take the automated protective action. For example, if the breach is with regard to an email account, only the email accounts and social media accounts may take the automated protective action, and the financial accounts, merchant accounts, etc. may be unaffected.

If, in step 230, the smart contract or self-executing code determines that the one of the rules, thresholds, parameters, etc. was not breached, in step 245, the smart contract or self-executing code may not take any action, and the smart contract or self-executing code may write this inaction to the distributed ledger.

In step 250, the resources may continue to monitor for additional activity.

Hereinafter, general aspects of implementation of the systems and methods of the invention will be described.

The system of the invention or portions of the system of the invention may be in the form of a "processing machine," such as a general purpose computer, for example. As used herein, the term "processing machine" is to be understood to include at least one processor that uses at least one memory. The at least one memory stores a set of instructions. The instructions may be either permanently or temporarily stored in the memory or memories of the processing machine. The processor executes the instructions that are stored in the memory or memories in order to process data. The set of instructions may include various instructions that perform a particular task or tasks, such as those tasks described above. Such a set of instructions for performing a particular task may be characterized as a program, software program, or simply software.

In one embodiment, the processing machine may be a specialized processor.

As noted above, the processing machine executes the instructions that are stored in the memory or memories to process data. This processing of data may be in response to commands by a user or users of the processing machine, in response to previous processing, in response to a request by another processing machine and/or any other input, for example.

As noted above, the processing machine used to implement the invention may be a general purpose computer. However, the processing machine described above may also utilize any of a wide variety of other technologies including a special purpose computer, a computer system including, for example, a microcomputer, mini-computer or mainframe, a programmed microprocessor, a micro-controller, a peripheral integrated circuit element, a CSIC (Customer Specific Integrated Circuit) or ASIC (Application Specific Integrated Circuit) or other integrated circuit, a logic circuit, a digital signal processor, a programmable logic device such as a FPGA, PLD, PLA or PAL, or any other device or arrangement of devices that is capable of implementing the steps of the processes of the invention.

The processing machine used to implement the invention may utilize a suitable operating system. Thus, embodiments of the invention may include a processing machine running the iOS operating system, the OS X operating system, the Android operating system, the Microsoft Windows™ operating system, the Unix operating system, the Linux operating system, the Xenix operating system, the IBM AIX™ operating system, the Hewlett-Packard UX™ operating system, the Novell Netware™ operating system, the Sun Microsystems Solaris™ operating system, the OS/2™ operating system, the BeOS™ operating system, the Macintosh operating system, the Apache operating system, an OpenStep™ operating system or another operating system or platform.

It is appreciated that in order to practice the method of the invention as described above, it is not necessary that the processors and/or the memories of the processing machine be physically located in the same geographical place. That is, each of the processors and the memories used by the processing machine may be located in geographically distinct locations and connected so as to communicate in any suitable manner. Additionally, it is appreciated that each of the processor and/or the memory may be composed of different physical pieces of equipment. Accordingly, it is not necessary that the processor be one single piece of equipment in one location and that the memory be another single piece of equipment in another location. That is, it is contemplated that the processor may be two pieces of equipment in two different physical locations. The two distinct pieces of equipment may be connected in any suitable manner. Additionally, the memory may include two or more portions of memory in two or more physical locations.

To explain further, processing, as described above, is performed by various components and various memories. However, it is appreciated that the processing performed by two distinct components as described above may, in accordance with a further embodiment of the invention, be performed by a single component. Further, the processing performed by one distinct component as described above may be performed by two distinct components. In a similar manner, the memory storage performed by two distinct memory portions as described above may, in accordance with a further embodiment of the invention, be performed by a single memory portion. Further, the memory storage performed by one distinct memory portion as described above may be performed by two memory portions.

Further, various technologies may be used to provide communication between the various processors and/or memories, as well as to allow the processors and/or the memories of the invention to communicate with any other entity; i.e., so as to obtain further instructions or to access and use remote memory stores, for example. Such technologies used to provide such communication might include a network, the Internet, Intranet, Extranet, LAN, an Ethernet, wireless communication via cell tower or satellite, or any client server system that provides communication, for example. Such communications technologies may use any suitable protocol such as TCP/IP, UDP, or OSI, for example.

As described above, a set of instructions may be used in the processing of the invention. The set of instructions may be in the form of a program or software. The software may be in the form of system software or application software, for example. The software might also be in the form of a collection of separate programs, a program module within a larger program, or a portion of a program module, for example. The software used might also include modular programming in the form of object oriented programming. The software tells the processing machine what to do with the data being processed.

Further, it is appreciated that the instructions or set of instructions used in the implementation and operation of the invention may be in a suitable form such that the processing machine may read the instructions. For example, the instructions that form a program may be in the form of a suitable programming language, which is converted to machine language or object code to allow the processor or processors to read the instructions. That is, written lines of programming code or source code, in a particular programming language, are converted to machine language using a compiler, assembler or interpreter. The machine language is binary coded machine instructions that are specific to a particular type of processing machine, i.e., to a particular type of computer, for example. The computer understands the machine language.

Any suitable programming language may be used in accordance with the various embodiments of the invention. Illustratively, the programming language used may include assembly language, Ada, APL, Basic, C, C++, COBOL, dBase, Forth, Fortran, Java, Modula-2, Pascal, Prolog, REXX, Visual Basic, and/or JavaScript, for example. Further, it is not necessary that a single type of instruction or single programming language be utilized in conjunction with the operation of the system and method of the invention. Rather, any number of different programming languages may be utilized as is necessary and/or desirable.

Also, the instructions and/or data used in the practice of the invention may utilize any compression or encryption technique or algorithm, as may be desired. An encryption module might be used to encrypt data. Further, files or other data may be decrypted using a suitable decryption module, for example.

As described above, the invention may illustratively be embodied in the form of a processing machine, including a computer or computer system, for example, that includes at least one memory. It is to be appreciated that the set of instructions, i.e., the software for example, that enables the computer operating system to perform the operations described above may be contained on any of a wide variety of media or medium, as desired. Further, the data that is processed by the set of instructions might also be contained on any of a wide variety of media or medium. That is, the particular medium, i.e., the memory in the processing machine, utilized to hold the set of instructions and/or the data used in the invention may take on any of a variety of physical forms or transmissions, for example. Illustratively, the medium may be in the form of paper, paper transparencies, a compact disk, a DVD, an integrated circuit, a hard disk, a floppy disk, an optical disk, a magnetic tape, a RAM, a ROM, a PROM, an EPROM, a wire, a cable, a fiber, a communications channel, a satellite transmission, a memory card, a SIM card, or other remote transmission, as well as any other medium or source of data that may be read by the processors of the invention.

Further, the memory or memories used in the processing machine that implements the invention may be in any of a wide variety of forms to allow the memory to hold instructions, data, or other information, as is desired. Thus, the memory might be in the form of a database to hold data. The database might use any desired arrangement of files such as a flat file arrangement or a relational database arrangement, for example.

In the system and method of the invention, a variety of "user interfaces" may be utilized to allow a user to interface with the processing machine or machines that are used to implement the invention. As used herein, a user interface includes any hardware, software, or combination of hardware and software used by the processing machine that allows a user to interact with the processing machine. A user interface may be in the form of a dialogue screen for example. A user interface may also include any of a mouse, touch screen, keyboard, keypad, voice reader, voice recognizer, dialogue screen, menu box, list, checkbox, toggle switch, a pushbutton or any other device that allows a user to receive information regarding the operation of the processing machine as it processes a set of instructions and/or provides the processing machine with information. Accordingly, the user interface is any device that provides communication between a user and a processing machine. The information provided by the user to the processing machine through the user interface may be in the form of a command, a selection of data, or some other input, for example.

As discussed above, a user interface is utilized by the processing machine that performs a set of instructions such that the processing machine processes data for a user. The user interface is typically used by the processing machine for interacting with a user either to convey information or receive information from the user. However, it should be appreciated that in accordance with some embodiments of the system and method of the invention, it is not necessary that a human user actually interact with a user interface used by the processing machine of the invention. Rather, it is also contemplated that the user interface of the invention might interact, i.e., convey and receive information, with another processing machine, rather than a human user. Accordingly, the other processing machine might be characterized as a user. Further, it is contemplated that a user interface utilized in the system and method of the invention may interact partially with another processing machine or processing machines, while also interacting partially with a human user.

It will be readily understood by those persons skilled in the art that the present invention is susceptible to broad utility and application. Many embodiments and adaptations of the present invention other than those herein described, as well as many variations, modifications and equivalent arrangements, will be apparent from or reasonably suggested by the present invention and foregoing description thereof, without departing from the substance or scope of the invention.

Accordingly, while the present invention has been described here in detail in relation to its exemplary embodiments, it is to be understood that this disclosure is only illustrative and exemplary of the present invention and is made to provide an enabling disclosure of the invention. Accordingly, the foregoing disclosure is not intended to be construed or to limit the present invention or otherwise to exclude any other such embodiments, adaptations, variations, modifications or equivalent arrangements.

What is claimed is:

1. A method for smart contract-based detection of authentication attacks, comprising:
    in an information processing apparatus comprising at least one computer processor:
        receiving an identification of a plurality of password-protected accounts associated with an account holder from the account holder;
        receiving a rule identifying an automated protective action to be taken in response to a failed login attempt to access one of password-protected accounts;
        receiving, at a distributed ledger, a notification of a login attempt to access one of the plurality of password-protected accounts;
        a smart contract or self-executing code executed by the information processing apparatus determining that the login attempt meets the rule;
        the smart contract or self-executing code taking the automated protective action with the one of the plurality of password-protected accounts and another of the plurality of password-protected accounts; and
        the smart contract or self-executing code committing the automated protective action to the distributed ledger.

2. The method of claim 1, wherein the password-protected accounts comprise at least two of a financial account, a social media account, an email account, and a merchant account.

3. The method of claim 1, wherein the password-protected accounts comprise financial accounts from a plurality of financial institutions.

4. The method of claim 1, wherein the rule identifies a number of failed login attempts before the automated protective action is taken.

5. The method of claim 1, wherein the automated protective action comprises locking access to the plurality of password-protected accounts.

6. The method of claim 1, wherein the automated protective action comprises requiring elevated authentication to login to any of the plurality of password-protected accounts.

7. The method of claim 1, wherein the automated protective action comprises notifying the account holder.

8. The method of claim 1, wherein the automated protective action is based on a prior automated protective action taken with one of the plurality of password-protected accounts.

9. The method of claim 1, wherein the notification of the login attempt comprises a number of login attempts, success or failure of the login attempt, a location of the login attempt, an IP address of the login attempt, a date and time of the login attempt, transaction particulars associated with the login attempt, and a type of login attempt.

10. The method of claim 9, wherein the transaction particulars comprises at least one of a merchant identifier, a transaction amount, and a type of good/service.

11. The method of claim 9, wherein the type of login attempt comprises at least one of a username/password login attempt or a biometric login attempt.

12. The method of claim 1, wherein the password-protected accounts with which the automated protective action is taken is based on a type of password-protected accounts for which the notification was received.

13. A system for smart contract-based detection of authentication attacks, comprising:
    an interface for an account holder;
    a plurality of hosts, each host hosting a password-protected account, each password-protected account associated with the account holder;
    a distributed ledger; and
    an information processing apparatus comprising at least one computer processor and executing a smart contract or self-executing code;

wherein:
the information processing apparatus receives an identification of the password-protected accounts from the interface for the account holder;
the information processing apparatus receives a rule identifying an automated protective action to be taken in response to a failed login attempt to access one of the password-protected accounts from the interface for the account holder;
the distributed ledger receives, from one of the hosts, a notification of a login attempt to access one of the plurality of password-protected accounts;
the smart contract or self-executing code determines that the login attempt meets the rule;
the smart contract or self-executing code takes the automated protective action with the one of the plurality of password-protected accounts and another of the plurality of password-protected accounts; and
the smart contract or self-executing code commits the automated protective action to the distributed ledger.

14. The system of claim 13, wherein the password-protected accounts comprise at least two of a financial account, a social media account, an email account, and a merchant account.

15. The system of claim 13, wherein the password-protected accounts comprise financial accounts from a plurality of financial institutions.

16. The system of claim 13, wherein the rule identifies a number of failed login attempts before the automated protective action is taken.

17. The system of claim 13, wherein the automated protective action comprises at least one of locking the plurality of password-protected accounts, requiring elevated authentication to login to any of the plurality of password-protected accounts, and notifying the account holder.

18. The system of claim 13, wherein the notification of the login attempt comprises a number of login attempts, success or failure of the login attempt, a location of the login attempt, an IP address of the login attempt, a date and time of the login attempt, transaction particulars associated with the login attempt, and a type of login attempt.

19. The system of claim 18, wherein the type of login attempt comprises at least one of a username/password login attempt or a biometric login attempt.

20. The system of claim 13, wherein the password-protected accounts with which the automated protective action is taken is based on a type of password-protected accounts for which the notification was received.

* * * * *